May 19, 1942.  D. T. MITCHELL  2,283,689

PILOT SOCKET FOR RADIOS

Filed April 19, 1941

INVENTOR.
D. T. Mitchell

BY

Patented May 19, 1942

2,283,689

UNITED STATES PATENT OFFICE 2,283,689

PILOT SOCKET FOR RADIOS

Douglas T. Mitchell, Scarsdale, N. Y.

Application April 19, 1941, Serial No. 389,318

2 Claims. (Cl. 173—328)

My invention relates to sockets for pilot lights on radios.

An object of the invention is to provide a simple and inexpensive light socket formed only of three parts.

In the appended drawing forming part of this application, Figure 1 is an elevation partially in section on lines 1—1, Figure 2 of a socket embodying my invention.

Figure 2:
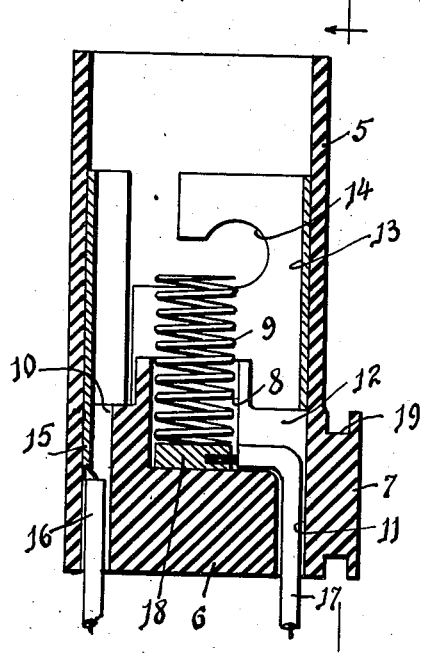
Figure 2 is a vertical section on lines 2—2, Figure 1.

Referring to the drawing, 5 is a shell of the socket which is molded from suitable plastic material, it has a bottom 6 and a lateral lug 7 preferably near the bottom. The bottom 6 has a central circular recess 8 terminating by a collar rising from the bottom and concentric with the shell. Positioned in the recess 8 is a coil spring 9. The bottom 6 has two ducts 10 and 11 running therethrough, located in diametrical opposition and entering the shell adjacent the inner periphery thereof. The duct 11 is connected to the recess 8 by an open cut out 12 in the bottom, accessible from the open end of the shell.

Positioned within the shell is a split metallic sleeve 13 provided with the customary bayonet slots 14. The sleeve 13 is connected to a wire 16 by an extension 15 from the sleeve which is housed in the duct 10 when the wire is located therein. A wire 17 is connected to a washer 18 to which the lower end of the spring 9 is anchored.

Figure 1:
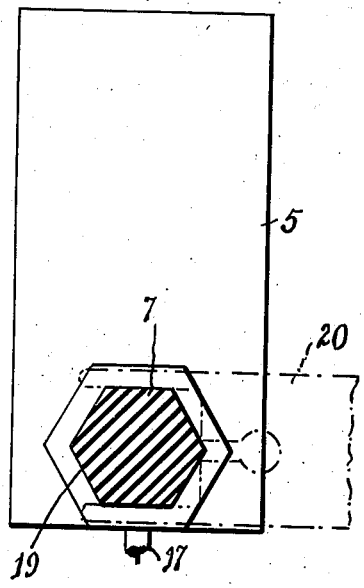
Figure 3:
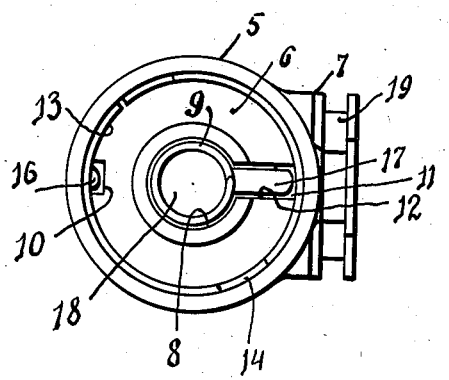
Figure 3 is a top plan view.
Figure 4:
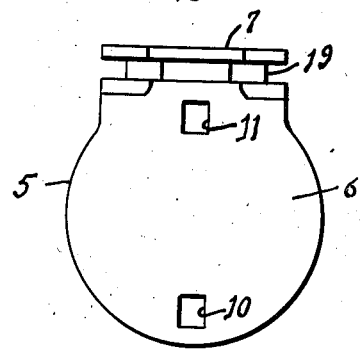
Figure 4 is a bottom plan.

The lateral lug 7 of the shell 5 has a groove 19 to engage a bracket 20, shown in dot and dash lines in Figure 1.

By constructing the socket as described, it can be easily assembled. The spring 9 with the wire 17 attached thereto is pushed into the recess 8, the wire 17 being previously passed through the duct 11. As the washer 18 anchored to the spring sets into the bottom of the recess 8, the portion of the wire 17 between the washer and the duct 11, enters the cut out 12 by which it is housed when the spring 9 is within the recess 8. The metal sleeve 13 is fitted into the shell 5 by slightly contracting it so that it will easily enter into the shell 5. The wire 16 being previously passed into the duct 10, so that when the bottom of the metal sleeve 13 touches or seats on to the bottom 6 of the shell 5, the extension 15 is located in the upper part of the duct 10. When the sleeve 13 is fully within the shell 5, its natural tendency to expand its being an open sleeve, makes a tight connection between the sleeve and the shell.

I claim:

1. In a light socket a molded shell of plastic material having a bottom at one end, said bottom having a circular recess concentric with the shell, a metallic coil spring positioned in the recess, said bottom having wire ducts therethrough entering the shell, and a cut out connecting one of the ducts to the recess, a wire connected to the spring, passing through the cut out into the duct, a metallic open sleeve fitting snugly into the shell and having means for engaging a bulb, and a wire in the other duct connected to the sleeve.

2. In a light socket a molded shell of plastic material having a bottom at one end, said bottom having a circular recess terminating by a collar rising from the bottom and concentric with the shell, a metallic coil spring positioned in the recess, said bottom having wire ducts therethrough entering the shell, said bottom having a cut out opening within the shell and connecting one of the ducts to the recess, a wire connected to the spring, passing through the cut out and entering the said duct, a metallic open sleeve fitting snugly into the shell and having means for engaging a bulb, said sleeve having an extension entering the said other duct, and a wire in the other duct connected to the sleeve.

DOUGLAS T. MITCHELL.